United States Patent

Crook et al.

[11] Patent Number: 5,984,369
[45] Date of Patent: Nov. 16, 1999

[54] ASSEMBLY INCLUDING TUBULAR BODIES AND MATED WITH A COMPRESSION LOADED ADHESIVE BOND

[75] Inventors: Russell A. Crook, Ogden; David M. Cannon, Layton; Larry W. Poulter, Ogden, all of Utah

[73] Assignee: Cordant Technologies Inc., Corinne, Utah

[21] Appl. No.: 09/094,569

[22] Filed: Jun. 15, 1998

Related U.S. Application Data

[60] Provisional application No. 60/049,777, Jun. 16, 1997.

[51] Int. Cl.$^6$ .................................................. F16L 25/00
[52] U.S. Cl. ........................ 285/21.1; 285/389; 285/421; 285/915
[58] Field of Search .................................. 285/21.1, 249, 285/323, 339, 342, 359, 389, 421, 915; 156/287; 411/24; 403/297

[56] References Cited

U.S. PATENT DOCUMENTS

| | | | |
|---|---|---|---|
| 1,120,368 | 12/1914 | Booraem et al. | 411/24 X |
| 3,391,951 | 7/1968 | Miller . | |
| 3,694,010 | 9/1972 | Callahan, Jr. . | |
| 3,854,759 | 12/1974 | Cornellus . | |
| 3,937,641 | 2/1976 | Kushner et al. . | |
| 4,028,988 | 6/1977 | Schafers | 403/297 X |
| 4,032,176 | 6/1977 | Tabary . | |
| 4,537,426 | 8/1985 | Carter, Sr. . | |
| 5,032,046 | 7/1991 | Fischer . | |
| 5,121,949 | 6/1992 | Reese . | |
| 5,161,916 | 11/1992 | White et al. . | |
| 5,344,268 | 9/1994 | Fischer . | |
| 5,352,066 | 10/1994 | Schaeffer et al. . | |
| 5,520,422 | 5/1996 | Friedrich et al. . | |
| 5,664,900 | 9/1997 | Matthies | 411/24 X |
| 5,879,030 | 3/1999 | Clayson et al. | 285/421 X |

FOREIGN PATENT DOCUMENTS

| 836 442 | 6/1981 | U.S.S.R. | 285/915 |
|---|---|---|---|

*Primary Examiner*—Eric K. Nicholson
*Assistant Examiner*—Greg Binda
*Attorney, Agent, or Firm*—Pillsbury Madison & Sutro Intellectual Property Group

[57] ABSTRACT

An assembly mating first and second tubular bodies is disclosed. The mating assembly includes at least a sleeve structure forming a part of the first tubular body and defining an inner receptacle surface region, a compression loading assembly integrally formed with, constituted by, or otherwise securable to the second tubular body and at least partially received in the sleeve structure, and a cured adhesive bond positioned between an exterior surface region of the compression loading assembly and the inner receptacle surface region to couple the sleeve structure to the compression loading assembly. The compression loading assembly is laterally expandable at at least the exterior surface region thereof and constructed and arranged relative to the cured adhesive bond so that expansion of the exterior surface region compressively loads the cured adhesive bond in a substantially lateral direction. The strength of the adhesive bond is thereby increased against shear stresses acting on said mating assembly due to longitudinal and/or torsional loading.

20 Claims, 6 Drawing Sheets

ASSEMBLY INCLUDING TUBULAR BODIES AND MATED WITH A COMPRESSION LOADED ADHESIVE BOND

This application claims the benefit of U.S. Provisional Application Ser. No. 60/049,777, filed Jun. 16, 1997.

BACKGROUND OF THE INVENTION

1. Field of the Invention

This invention relates to assemblies having two or more bodies mated with an adhesive material reinforced by lateral compression loading, and in particular to such assemblies in which the adhesive bond strength is augmented by reducing stresses lateral to the adhesive bond due to longitudinal and/or torsional loading. This invention is especially suitable for use in strut tube assemblies and rocket assemblies.

2. Description of Related Art

Vessels and other containers capable of handling extreme axial loads and/or high internal operation pressures can be found in various technical fields and have been employed in connection with wide and diverse applications. Such vessels have been used, for example, as tubular struts and rocket motor casings.

Many of these applications require one or both ends of the vessels to be equipped with appropriate end fittings. One example of a pressurized vessel equipped with end fittings is a case assembly of a small tactical rocket assembly, which is illustrated in exploded view in FIG. 9 and generally designated by reference numeral 900. The illustrated embodiment of the case assembly 900 includes a case sleeve 902, in which a forward receptacle end 904 accommodates a mating portion 910 of a forward end fitting 908 and an aft receptacle end 906 accommodates a mating portion 914 of an aft end fitting 912. Although not shown in FIG. 9, the aft end fitting 912 can constitute, be formed integrally with, or otherwise be firmly secured to a nozzle assembly, whereas the forward end fitting 908 can likewise be connected to an aerodynamic conical member, warhead, other structural components and combinations thereof. Mechanisms useful for securing the end fittings 908 and 912 to nozzle assemblies, conical members and the like include, among others, welds, bolts, adhesive joints, screw threads, a lock wire, the like, or combinations thereof.

The end fittings 908 and 912 are connected to the case sleeve 902 via adhesive bonds. The adhesive bonds are formed by applying a polymeric or functionally comparable adhesive to and in-situ curing the adhesive at opposing bonding surfaces defined between the receptacle ends 904 and 906 of the rocket motor casing 902 and the associated mating portions 910 and 914 of the forward and aft end fittings 908 and 912, respectively.

During normal operation, shear stresses develop within the adhesive as the result of axial load differentiations (applied in the direction designated by arrow $L_a$ in FIG. 9) between the case sleeve 902 and end fittings 908 and 912 caused by, among other things, internal pressure, acceleration of the rocket assembly 900 and sudden deceleration. In addition, lap shear joints have an inherent moment because the load path is not linear. The moment causes the development of lateral (or normal) stresses in the adhesive bond system. For some applications, the adhesive bond does not possess sufficient strength to withstand the shear and normal stresses encountered in these operating conditions. In order to compensate for inherent weaknesses in the adhesive bond connecting the end fittings 908 and 912 to the forward and aft receptacle ends 904 and 906 of the case sleeve 902, it is often necessary to provide supplemental mechanical fasteners (not shown) to reinforce the adhesive bonds. Conventional supplemental fasteners include blind fasteners such as pop rivets, standard nuts and bolts, or bolts that extend through the tubular piece and thread into the end fitting. Without the provision of the supplemental mechanical fasteners, extreme shear and normal stresses acting on the adhesive bond may lead to failure at the opposing bonded surfaces with catastrophic results.

Despite the beneficial contribution of conventional supplemental mechanical fasteners as reinforcements, the use of such fasteners is often discouraged due to their expense and weight penalty. The reality of marketplace demands on minimizing costs has, to a large extent, made the use of supplemental mechanical fasteners cost prohibitive for some applications. Also, for design purposes, the exclusion of mechanical fasteners is desirable, since their presence can lower the linear design allowable because of bearing stresses in the composite case.

A need therefore exists for an assembly including a vessel connected to at least one end fitting via an adhesive bond, which adhesive bond is designed to tolerate large shear stress encountered during operation without the need for supplemental mechanical fasteners.

SUMMARY OF THE INVENTION

It is, therefore, an object of this invention to solve the aforementioned problems associated with the related art as well as to address the need expressed above.

In accordance with the principles of this invention, this and other objects are attained by providing an assembly mating first and second substantially tubular bodies with a compression-loaded cured adhesive bond. In accordance with an embodiment of this invention, the mating assembly includes a sleeve structure forming a part of the first tubular body and having an inner receptacle surface region, and a compression loading assembly integrally formed with, constituted by, or otherwise securable to the second tubular body. The compression loading assembly is at least partially received in the sleeve structure, with the cured adhesive bond being positioned between and coupling an exterior surface region of the compression loading assembly to the inner receptacle surface region of the sleeve structure. The compression loading assembly is laterally (or radially) expandable at at least the exterior surface region thereof and is constructed and arranged so that expansion of the exterior surface region compressively loads the cured adhesive bond in a substantially lateral direction. Expansion of the exterior surface region of the compression loading assembly causes a corresponding compressive load to be applied to the adhesive material in a direction substantially normal to the adhesive bond, thereby increasing the strength of the adhesive bond by reducing stresses lateral to the adhesive bond due to longitudinal and/or torsional loading. Adding compressive stress, i.e., negative tensile stress, also reduces or eliminates normal stresses.

As referred to herein, the phrases "substantially lateral direction" and "substantially normal to the adhesive bond" are meant to encompass instances in which the compression loading assembly applies a load having a larger lateral component than an axial component, especially instances in which the load is entirely lateral.

As referred to herein, substantially tubular body includes elongated bodies having circular or polygonal shaped (e.g., square, pentagon, hexagon, octagon) cross-sections.

The compression loading assemblies provided in accordance with the various embodiments of this invention can be tailored to impart various levels of lateral compressive loads on the bonded joint by mechanical, pneumatic and/or hydraulic loading, for example, to optimize the shear strength of the bonded joint. The compression loading assemblies can be employed for non-pressurized vessels and pressure vessels of various sizes and shapes. The compression loading assemblies can be constructed and arranged to apply (i) a constant compressive pre-load independent of applied axial load or (ii) a variable compressive load applied in use as the joint is stressed and influenced by an associated applied axial load and/or internal pressure.

The compression loading assemblies provided in accordance with the various embodiments of this invention also obviate the need for supplemental mechanical fasteners, although the assemblies described herein do not necessarily preclude the use of such supplemental mechanical fasteners for reinforcing the adhesive bond.

The principles of this invention enunciated above are applicable to all types of adhesive bond joints, but have particular applicability to adhesive bond joints formed at composite-metal, metal—metal, and composite-composite interfaces. The joints can also be used at interfaces involving a non-reinforced polymeric structure, such as, without limitation, a PVC/PVC joint. Moreover, while the principles of this invention are especially applicable for small tactical rocket motors, this invention also relates to other applications, such as, for example and without limitation, strut tubes, pipe unions, pipe terminations, liquified petroleum gas (LPG) tanks, and the like.

These and other objects, features, and advantages of this invention will become apparent from the following detailed description when taken in conjunction with the accompanying drawings which illustrate, by way of example, the principles of this invention.

BRIEF DESCRIPTION OF THE DRAWINGS

The accompanying drawings illustrate various embodiments of this invention. In such drawings.

DETAILED DESCRIPTION OF EMBODIMENTS OF THE INVENTION

After extensive study on the matter, the inventors sought to accomplish the aforementioned objects by investigating the relationship between compression loading of an adhesive bond joint (in the lateral or radial direction $L_c$ in FIG. 9) and the amount of shear stress that the adhesive bond joint subjected to lateral compression loading can tolerate prior to failure. The results of this investigation are summarized in graphical form in FIG. 10.

Figure 10:
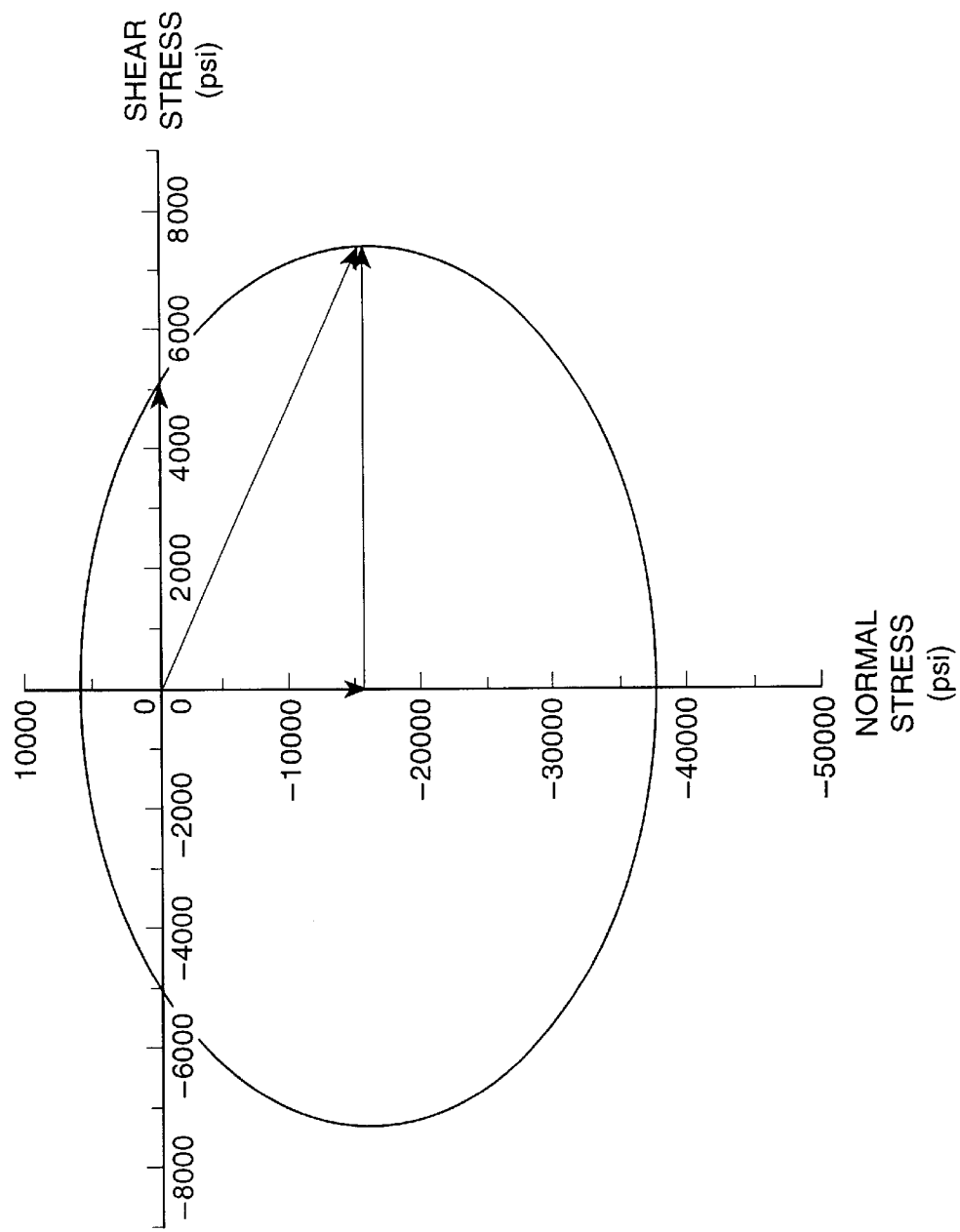
FIG. 10 is a graph illustrating the relationship between compression loading of an adhesive bond joint and the shear strength of the adhesive bond joint.

Referring to FIG. 10, the ordinate of the graph represents the stress (psi) (stress is equal to load/cross-section area in lbs/unit area) placed in the adhesive bond joint along a direction normal to the joint, or a normal stress. A negative normal stress, i.e., a stress that is disposed below the abscissa in FIG. 10, is defined as a compressive stress, whereas a positive normal stress, i.e., a stress that is disposed above the abscissa in FIG. 10, is defined as a tensile stress. The abscissa of the graph represents the shear stress (psi) acting in the adhesive bond joint. As shown in FIG. 10, the compression loading of an adhesive bond joint can increase the maximum allowable shear stress, i.e., the amount of shear stress that the adhesive bond joint can tolerate prior to failure, by about 50% relative to a comparable adhesive bond joint not subject to any compression loading. It is also noted that since the shear stress acting on the adhesive bond joint is generated by axial loading, the level of compressive loading appropriate for optimizing shear strength depends upon the surface areas (i.e., both the diameters and axial lengths) of the interfacing bonding surfaces. Thus, by selecting appropriate bond joint dimensions, lateral compressive loading can augment the bond shear strength even more than shown in FIG. 10.

Set forth below are various embodiments of assemblies, each of which comprises at least one compression loading assembly having an exterior surface region outwardly expandable in a lateral (or radial) direction and constructed and arranged relative to an adhesive bonding material such that the outward expansion of the exterior surface region of the compression loading assembly causes a compressive load to be applied to the adhesive bonding material to increase the shear strength of the adhesive bonding material, which optionally may be sealed in a cavity.

Figure 1:
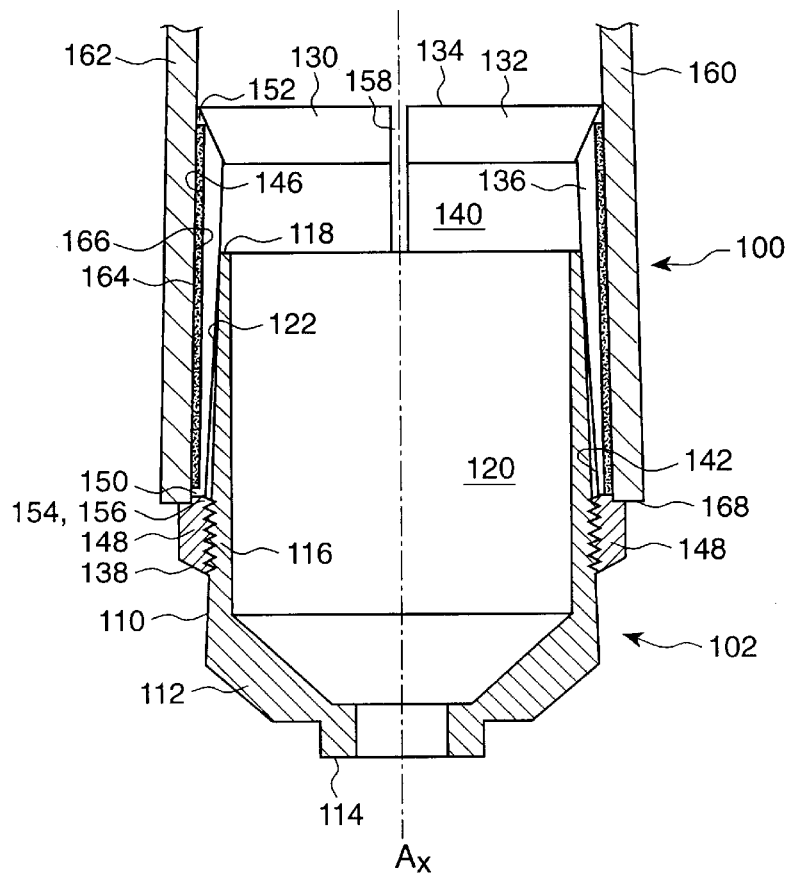
FIG. 1 is sectional view of a mating assembly including a compression loading assembly in accordance with a first embodiment of this invention.

Referring now more particularly to the drawings, there is shown in FIG. 1 one embodiment of the inventive assembly, which is generally designated by reference numeral 100.

The assembly 100 includes a compression loading assembly, generally designated by reference numeral 102, for pre-loading an adhesive bond. The compression loading assembly 102 comprises a wedge member 110 and a laterally-expandable member 130, each having a cylindrical shape in the illustrated embodiment (hence, member 130 is radially expandable). The wedge and laterally-expandable members 110 and 130 coaxially share longitudinal axis $A_x$.

In FIG. 1, the wedge member 110 has first and second ends 114 and 118 with a base 112 at the first end 114. An elongated tube 116 is integrally formed with and extends from the base 112 and terminates at the second end 118 to thereby define an open cylindrical chamber 120. The elongated tube 116 has a tapering outer surface region 122 (also referred to as the wedge-member tapering region) tapering radially inward between the first end 114 and the second end 118 so as to exhibit a frustro-conical configuration. Although not shown in FIG. 1, the wedge member 110 can constitute part of, be formed integrally with or otherwise be firmly securely to a second body, such as an end closure (not shown in FIG. 1), with, for example and without limitation, welding joints, bolts, adhesive joints, screw threading, the like, or a combination thereof.

The laterally-expandable member 130 also has first and second ends 134 and 138, with a base 132 at the first end 134 and an elongated tube 136 extending from the base 132 and terminating at the second end 138 to define an open cylindrical chamber 140. In the illustrate embodiment, at least one elongated slot 158 extends in an essentially longitudinal direction from the first end 134 and along a portion of the length of the tube 136. The elongated tube 136 has a tapering inner surface region 142 (also referred to as a laterally-expandable-member tapering region) tapering radially inwardly between the second and first ends 138 and 134. The tapering regions 122 and 142 preferably taper at the same rate.

The assembly 100 further comprises a sleeve structure 162 forming a part of a first body 160 and defining an inner receptacle surface region 166 and a receptacle end 168. The sleeve structure 162 preferably has a high stiffness. In FIG. 1, the laterally-expandable member 130 is partially received by the sleeve structure 162 in such a manner that the laterally-expandable-member tapering region 142 has its narrower end disposed farther into the sleeve structure 162 than its wider end.

Peripheral shims 150 and 152 circumferentially surround an exterior surface region 146 of the laterally-expandable member 130 and are spaced longitudinally from each other. The shims 150 and 152 can be integrally formed with or otherwise connected to the laterally-expandable member 130 or the first body 160. The inner receptacle surface region 166 and the laterally-expandable-member exterior surface region 146 respectively define outer and inner surfaces of an annular cavity 164, while shim rings 150 and 152 define ends of the cavity 164. The radial dimensions of the shim rings 150 and 152 and the longitudinal spacing between the shim rings 150 and 152 can be selected to give the cavity 164 a desired (often uniform) thickness and desired length, respectively. The annular cavity 164 contains one or more resins or adhesives, which are cured to form the adhesive bond.

In the illustrated embodiment, the laterally-expandable member 130 includes a flange 148 with a shoulder abutted against the receptacle end 168 to facilitate positioning and limit excess movement of the laterally-expandable member 130 into the first body 160.

At least a portion of the wedge-member tapering region 122 is receivable in and movable relative to the laterally-expandable member 130 between load-free and load-imparting positions. In the load-free position, each portion of the wedge-member tapering region 122 is not larger in lateral dimension than a longitudinally-corresponding portion of the laterally-expandable-member tapering region 142, so that the tapering region 142 is not laterally expanded by the tapering region 122. Conversely, relative movement of the wedge member 110 towards the sleeve structure 162 and into the load-imparting position causes a portion of the wedge-member tapering region 122 to contact and urge laterally outward a longitudinally-corresponding portion of the laterally-expandable-member tapering and exterior surface regions 142 and 146 to compressively load the cured adhesive material in the cavity 164. The slots 158 facilitate the outward flexing of the laterally-expandable-member tapering region 142. The load transferred to the adhesive can be controlled by regulating the axial positioning of the wedge member 110 relative to the laterally-expandable member 130.

In the illustrated embodiment, the wedge and laterally-expandable members 110 and 130 contain complementary threaded surfaces 154 and 156, respectively. The laterally-expandable-member threaded surface 156 is formed on the flange 148, while the wedge-member threaded surface 154 is formed on a corresponding region of the wedge member 110, i.e., proximal to the base 112. The complementary threaded surfaces 154 and 156 cooperatively engage each other by rotating the wedge member 110 relative to the laterally-expandable member 130 and thereby serve as a compression load controlling mechanism to provide precise control over the desired level of radial expansion (and hence compressive load applied on the adhesive bond joint).

Alternative embodiments of this invention will now be described with reference to FIGS. 2–8. To facilitate an understanding of the structure and operation of these embodiments, and in the interest of brevity, the components of the embodiments of FIGS. 2–8 corresponding in structure and/or function with the components of the embodiment in FIG. 1 have been designated by the same reference numerals to those used to designate the corresponding components of the embodiment of FIG. 1, with the substitution of the prefix numeral 2, 3, 4, 5, 6, 7, or 8, respectively. For example, the corresponding structure to the compression loading assembly 102 shown in FIG. 1 is designated by reference numeral 202 in FIG. 2.

Figure 2:
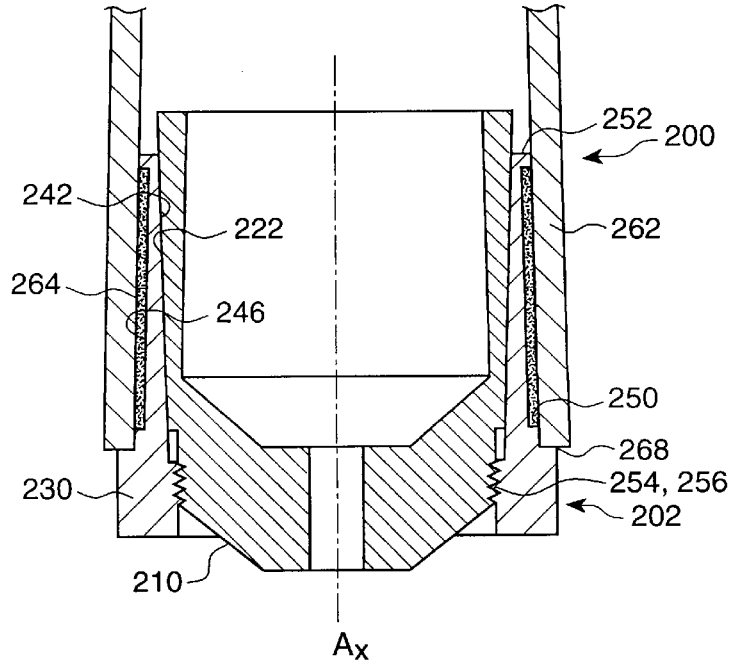
FIG. 2 is a sectional view of a mating assembly including a compression loading assembly in accordance with a second embodiment of this invention.

An assembly according to a second embodiment of this invention is illustrated in FIG. 2 and generally designated by reference numeral 200. As shown in FIG. 2, the wedge and laterally-expandable members 210 and 230 are partially received by the sleeve structure 262 in such a manner that each of the wedge-member tapering region 222 and the laterally-expandable-member tapering region 242 has its wider end disposed farther into the sleeve structure 262 than its narrower end. (Thus, the tapering regions 222 and 242 taper in opposite directions (relative to the sleeve structure 262) than the tapering regions 122 and 142 of the first embodiment illustrated in FIG. 1.) Preferably, the wedge-member tapering region 222 tapers in the same direction and at the same rate as the laterally-expandable-member tapering region 242.

Although not shown in FIG. 2, the wedge member 210 can be formed integrally with or otherwise firmly securely to a second body (e.g., an end closure) with, for example and without limitation, welding joints, bolts, adhesive joints, screw threads, the like, or any combination thereof.

As in the first embodiment, peripheral shim rings 250 and 252 circumferentially surround the exterior surface region 246 to assist in forming a substantially annular cavity 264 for receiving one or more resins or adhesives to form the adhesive bond joint.

At least a portion of the wedge-member tapering region 222 of the wedge member 210 is receivable in and movable relative to the laterally-expandable member 230 between load-free and load-imparting positions. In the load-free position, each portion of the wedge-member tapering region 222 is not larger in lateral dimension than a longitudinally-corresponding portion of the laterally-expandable-member tapering region 242, so that the tapering region 242 is not expanded by the tapering region 222. Conversely, relative movement of the wedge member 210 away from the sleeve structure 262 and into the load-imparting position causes at least a portion of the wedge-member tapering region 222 to contact and urge laterally outward a longitudinally-corresponding portion of the laterally-expandable-member tapering and exterior surface regions 242 and 246 to compressively load the cured adhesive material in the cavity 264. The load transferred to the adhesive can be controlled by regulating the axial positioning of the wedge member 210 relative to the laterally-expandable member 230.

The wedge and laterally-expandable members 210 and 230 may contain complementary threaded surfaces 254 and 256, respectively. The complementary threaded surfaces 254 and 256 are cooperatively engageable with each other by rotating the wedge member 210 relative to the laterally-expandable member 230. The complementary threaded surfaces 254 and 256 can also serve compression load controlling mechanism to provide more precise control over the desired level of lateral expansion (and hence compressive load applied on the adhesive bond joint).

Alternatively the assembly 200 may be provided without complementary threads. In such a case, as the first and second bodies of the assembly 200 are moved away from each other (for example, by axial load differentials), the wedge-member tapering region 222 is driven farther into the laterally-expandable-member tapering region 242, thereby increasing the lateral expansion of the laterally-expandable-member exterior surface region 246 and increasing the compressive load imparted on the adhesive disposed in the cavity 264. Accordingly, compressive load is dependent upon the axial load placed on the assembly 200.

In its broadest aspects, several variations and modifications to the above-discussed mating structures and compression loading assemblies can be implemented without departing from the scope of this invention.

Figure 3:
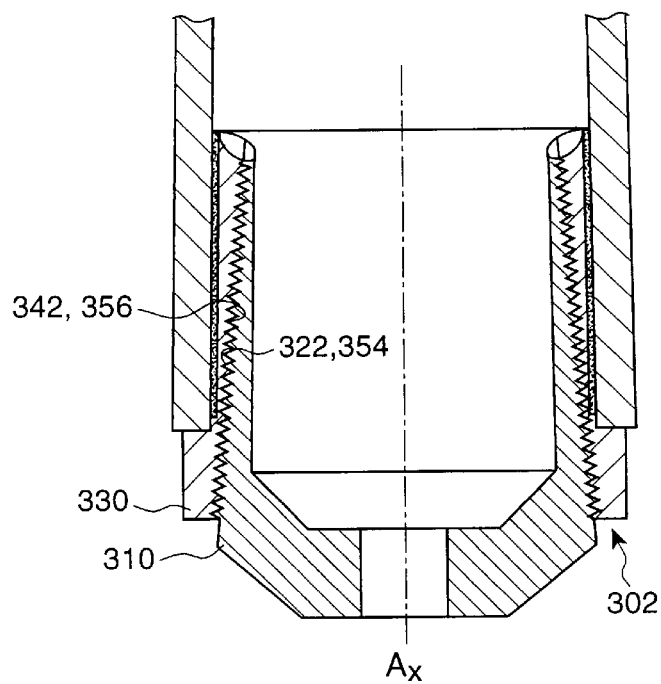
FIG. 3 is a sectional view of a mating assembly including a compression loading assembly similar to FIG. 1, but modified in accordance with another embodiment of this invention.
Figure 4:
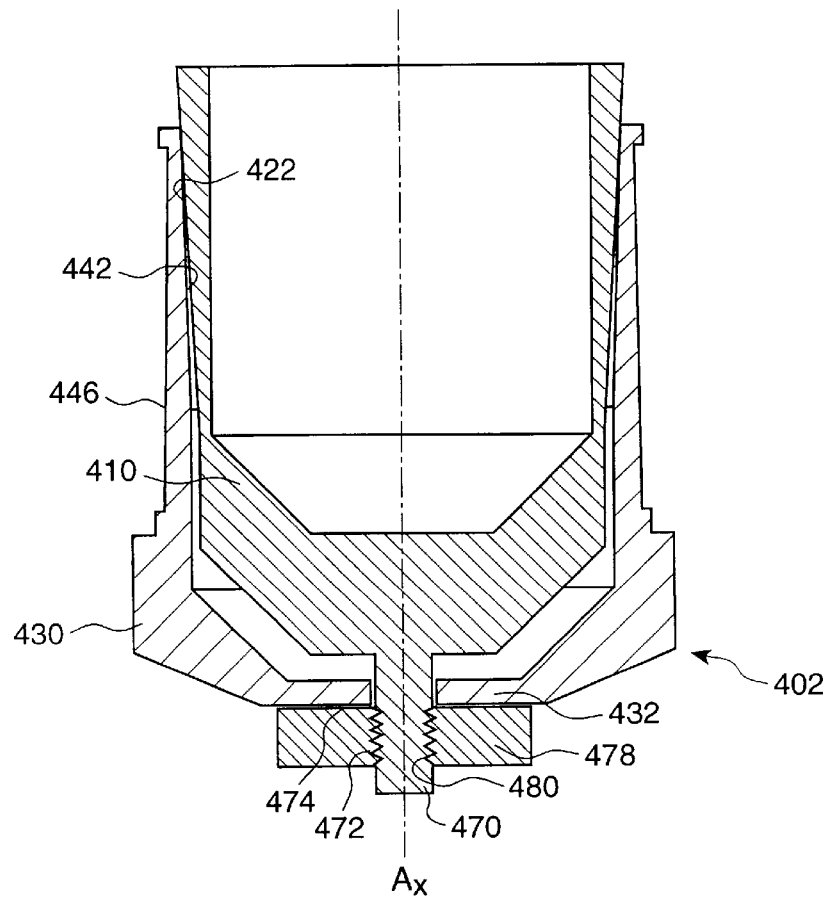
FIG. 4 is a sectional view of a mating assembly including a compression loading assembly similar to FIG. 2, but modified in accordance with another embodiment of this invention.

For example, in the compression loading assembly 302 shown in FIG. 3, the wedge member 310 has screw threads 354 extending along the entire length of the wedge-member tapering surface region 322 and the laterally-expandable member 330 has complementary screw threads 356 extending along the entire length of the laterally-expandable-member tapering surface region 342. The complementary threaded surfaces of this third embodiment can similarly be employed with the compression loading assembly 202 of FIG. 2 having tapering regions that taper in the opposite direction.

In accordance with another variant of this invention, compression loading assemblies having an additional or alternative compressive load controlling mechanism can be employed within the scope of this invention. For instance, in the compression loading assembly 402 shown in FIG. 4, the compression load controlling mechanism includes a bore 474 defined through the center of the base 432 of the laterally-expandable member 430, an elongated protrusion 470 with a threaded surface 472 extending from the wedge member 410 and through the bore 474, and a compressive load adjusting member 478, e.g., a nut, having an aperture (unnumbered) with a threaded surface 480 complementary of the threaded surface 472. The compressive load adjusting member 478 is adjustable to control the longitudinal position of the tapering region 422 of the wedge member 410 relative to the tapering region 442 of the laterally-expandable member 430 to impart a desired degree of expansion to the laterally-expandable-member exterior surface region 446 (and hence compressive load applied on the adhesive bond (not shown in FIG. 4)).

Alternatively, the compression loading assembly of this invention can be employed without complementary threads or other fastening members for adjusting the positional relationship between the wedge and laterally-expandable members.

Figure 5:
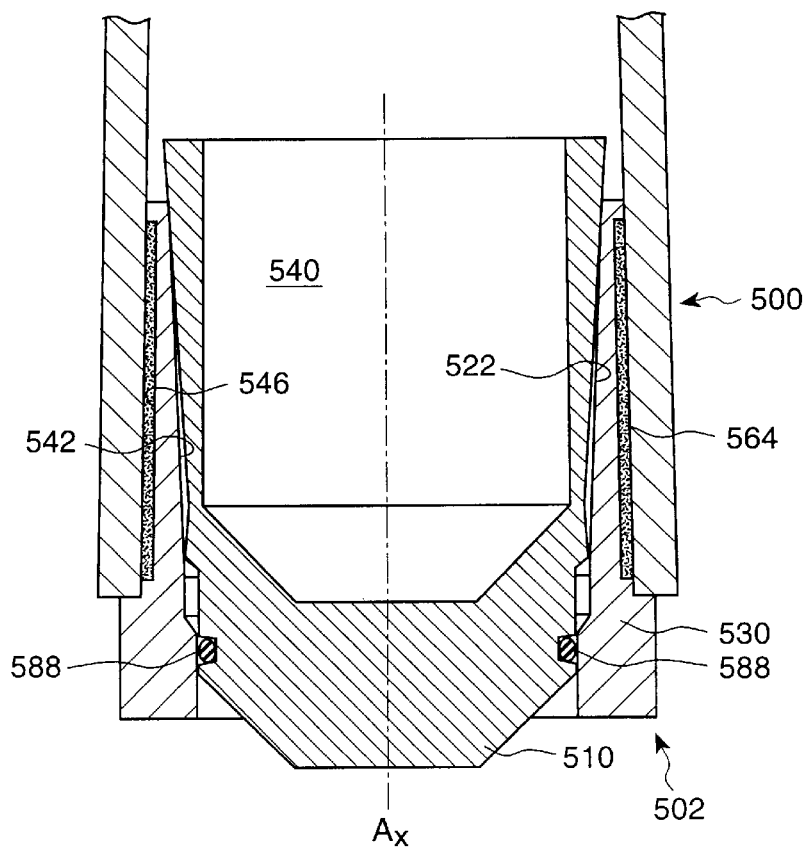
FIG. 5 is a sectional view of a mating assembly including a compression loading assembly according to yet another embodiment of this invention.

The assembly 500 shown in FIG. 5 employs a hybrid of mechanical and pneumatic (or hydraulic) mechanisms for imparting the compressive load, and is especially suitable for use with a pressurized tube. In the illustrated embodiment, the wedge member 510 is disposed in the laterally-expandable member 530 then pneumatically (or hydraulically) loaded. The loading of the compression loading assembly 502 drives an wedge-member tapering region 522 farther into the laterally-expandable-member tapering region 542, expanding at least a portion of the laterally-expandable-member exterior surface region 546 outward. The expansion of the tapering region 542 translates a compressive load to the adhesive located in the annular cavity 564. The O-ring 588 serves to hermetically seal the chamber 540 and maintain the application of the pneumatic (or hydraulic) load. The level of the compressive load transferred to the adhesive, i.e., movement of the wedge member 510 between the load-free and load-imparting positions, may be controlled by regulating the internal pressure of the assembly 500 in use, and hence the axial positioning of the wedge member 510 relative to the laterally-expandable member 530.

Figure 6:
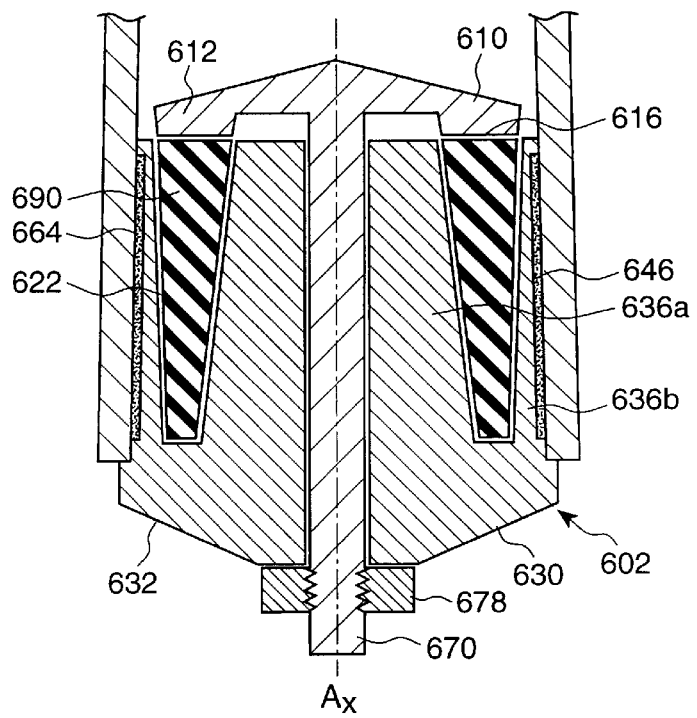
FIG. 6 is a sectional view of a mating assembly including a compression loading assembly according to still another embodiment of this invention.
Figure 7A:
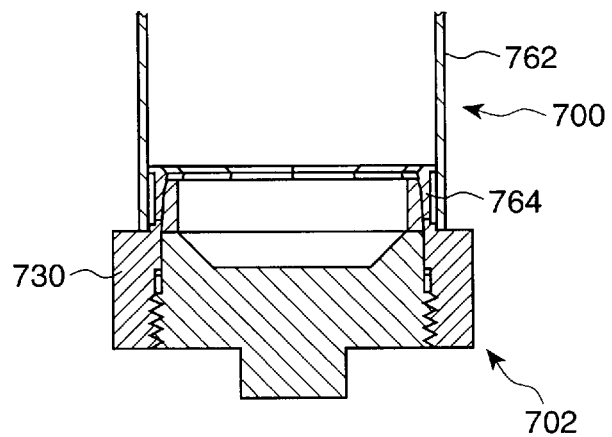
FIGS. 7A and 7B are sectional and exploded-sectional views of a mating assembly including a compression loading assembly in accordance with another embodiment of this invention.
Figure 7B:
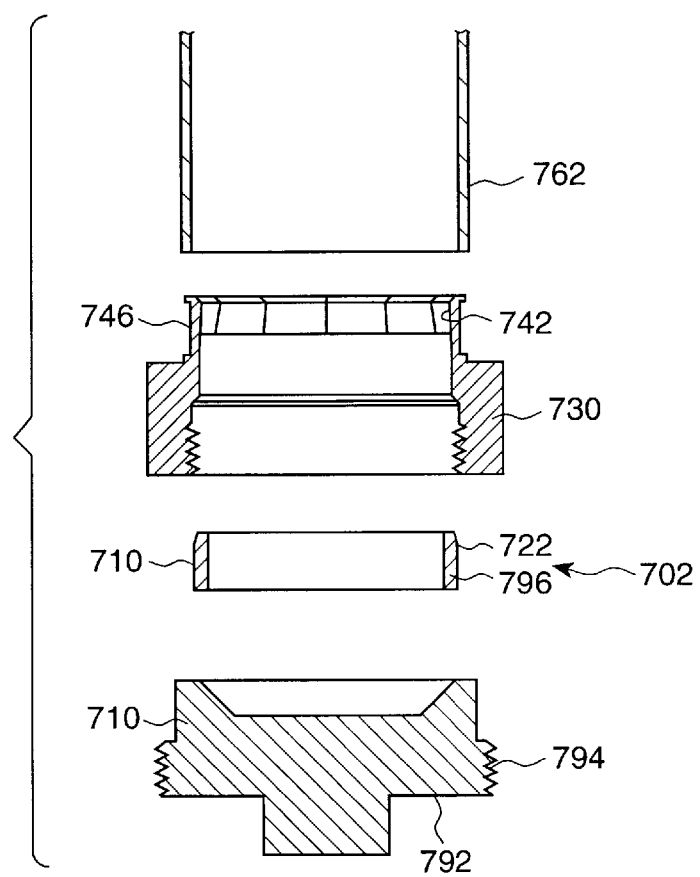

Another variation of this invention is shown in FIG. 6, in which the compression loading assembly 602 further comprises an elastic component 690, such as rubber or other material with a high Poisson ratio or similar material exhibiting good memory so that, upon release of tension, the material retracts into and recovers its original volume or a volume substantially similar to its original volume.

The laterally-expandable member 630 has inner and outer annular portions 636a and 636b extending from the base 632 to define an annular channel (unnumbered) therebetween that accommodates the elastic component 690. The base 612 of the wedge member 610 includes an annular flared portion 616 extending from its periphery to the elastic component 690. The compression load controlling mechanism includes a bore defined through the inner annular portion 636a, a protrusion 670 extending from the center of the base 612 and through the bore, and a compressive load adjusting member 678, e.g., a nut, having an aperture with a threaded surface region complementary to a threaded surface region of the protrusion 670. The compressive load adjusting member 678 is rotatable relative to the protrusion 670 so as to cause the longitudinal compressive load applied to the elastic component 690 to move between the load-free position and load-imparting positions. In the load-free position, the elastic component 690 is not compressed longitudinally to such a degree that it expands the laterally-expandable-member exterior surface region 646. In the load-imparting position, the elastic component 690 is compressed longitudinally to such a degree that at least a portion of the wedge-member outer surface region 622 becomes larger in lateral dimension than a longitudinally-corresponding portion of the laterally-expandable-member inner surface region so as to expand the laterally-expandable-member exterior surface region 646 laterally outward, thereby compressively loading the cured adhesive bond in cavity 664 in the lateral direction.

Also encompassed within the scope of this invention are compression loading assemblies comprising more than two members (i.e., the wedge and laterally-expandable members), and compression loading assemblies with members comprising a plurality of components. For example, the compression loading assembly 702 illustrated in FIGS. 7A and 7B includes a wedge member 710 comprising a first wedge component 792 having a threaded surface 794 and a second wedge component 796 having a tapering surface region 722 constructed and arranged to contact and laterally expand tapering surface region 742 of laterally-expandable member 730. The first wedge component 792 is movable relative to the laterally-expandable member 730 to slide the second wedge component 796 between the load-free and load-imparting positions. In the load-imparting position, a portion of the second-wedge-component tapering region 722 contacts and urges laterally outward a longitudinally-corresponding portion of the laterally-expandable-member exterior surface region 746 to compressively load the cured adhesive material in the cavity 764, which is partially defined by the sleeve structure 762. The load transferred to the adhesive can be controlled by regulating the axial positioning of the first wedge component 792 relative to the laterally-expandable member 730.

Figure 8:
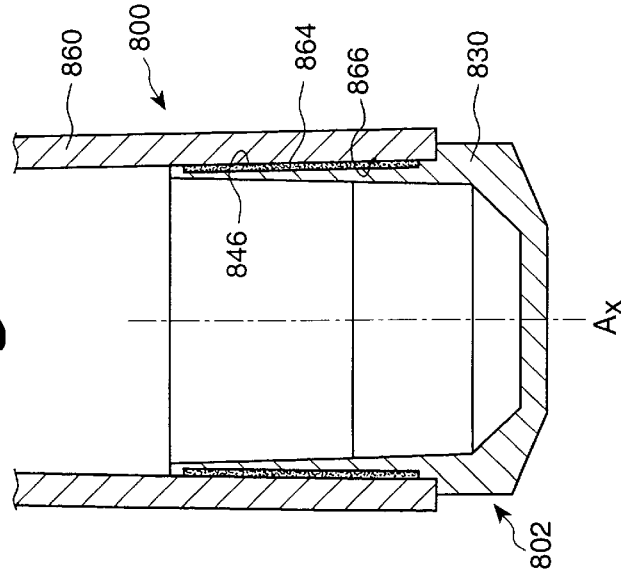
FIG. 8 is a sectional view of a mating assembly including a compression loading assembly in accordance with yet another embodiment of this invention.

FIG. 8 illustrates an alternative embodiment of an assembly 800 comprising a compression loading assembly 802 including a laterally-expandable member 830, but no cooperating internal wedge member. The compression load on the adhesive bond is achieved by injecting and curing an adhesive material in the cavity 864 defined between an outer surface region 846 of the laterally-expandable member 830 and an inner surface region 866 of the first body 860. The laterally-expandable member 830 is then pneumatically loaded. Axial restraints (not shown), such as a vice, can be used to prevent the member 830 from expanding axially during pneumatic loading, so that the member 830 is forced to expand laterally outward and transfer the load to the adhesive bond joint and compress the bond joint. The laterally-expandable member 830 is designed to yield circumferentially, so that the pneumatic loading permanently deforms and sets the member 830, not entirely releasing the compressive load on the adhesive even when the internal pressure within the structure 830 is reduced.

Various other modifications and variations of the above-discussed embodiments are encompassed within the scope of this invention, including by way of example the following:

(a) only one of the wedge and laterally-expandable members may have a tapering region, or the tapering regions may taper at different angles and/or rates;

(b) the tapering regions of the wedge member and/or laterally-expandable member may be selected to extend continuously or non-continuously over a portion or their entire lengths;

(c) the laterally-expandable structure may be made of a flexible material, such that insertion of the portion of the tapering region of the wedge member into the chamber of the laterally-expandable member urges the laterally-expandable member to flex outward;

(d) the laterally-expandable member may be provided with none, one, or a plurality of the elongated slots, and one or more of the slots may be replaced with slot-forming members, such as grooves, which extend only partially across the thickness of the laterally-expandable member yet which are designed to fracture through the laterally-expandable member upon loading via the wedge member;

(e) the annular cavity may be partitioned into a plurality of regions by, for example, ridges extending longitudinally or circumferentially along the outer surface region of the laterally-expandable member;

(f) the wedge and laterally-expandable members may have polygonal or other shaped cross sections;

(g) one or both of the tapering surfaces of the laterally-expandable and wedge member may have ridges, protrusions, or other formations integrally or non-integrally formed thereon, so that the tapering surfaces contact each other at these formations; and (h) the shim rings can also be replaced or supplemented with distributed shims that do not continuously extend around the outer periphery of the laterally-expandable member, so long as the shims serve to preserve the bond thickness of the adhesive joint.

It is further understood that the features and components of the above-discussed embodiments and variations thereof can be combined and interchanged in numerous combinations to serve the principles and accomplish the objects of this invention.

The above-discussed embodiments of this invention find particular applicability in connection with a case assemblies of small tactical rocket assemblies. Such assemblies may comprise a case sleeve structure, a forward end closure disposed at the forward end of the case sleeve structure, and an aft end closure disposed at the aft end of the case sleeve structure. The case sleeve structure may be a resin-impregnated-filament-wound pressure vessel. The end closures may be formed from an aerospace-aircraft metal alloy, such as an aluminum alloy, such as 7075 aluminum alloy with a selected temper, such as a T7351 temper, but may be formed from another metal (e.g., titanium) metal alloy (e.g., steel), composite or plastic.

Figure 9:
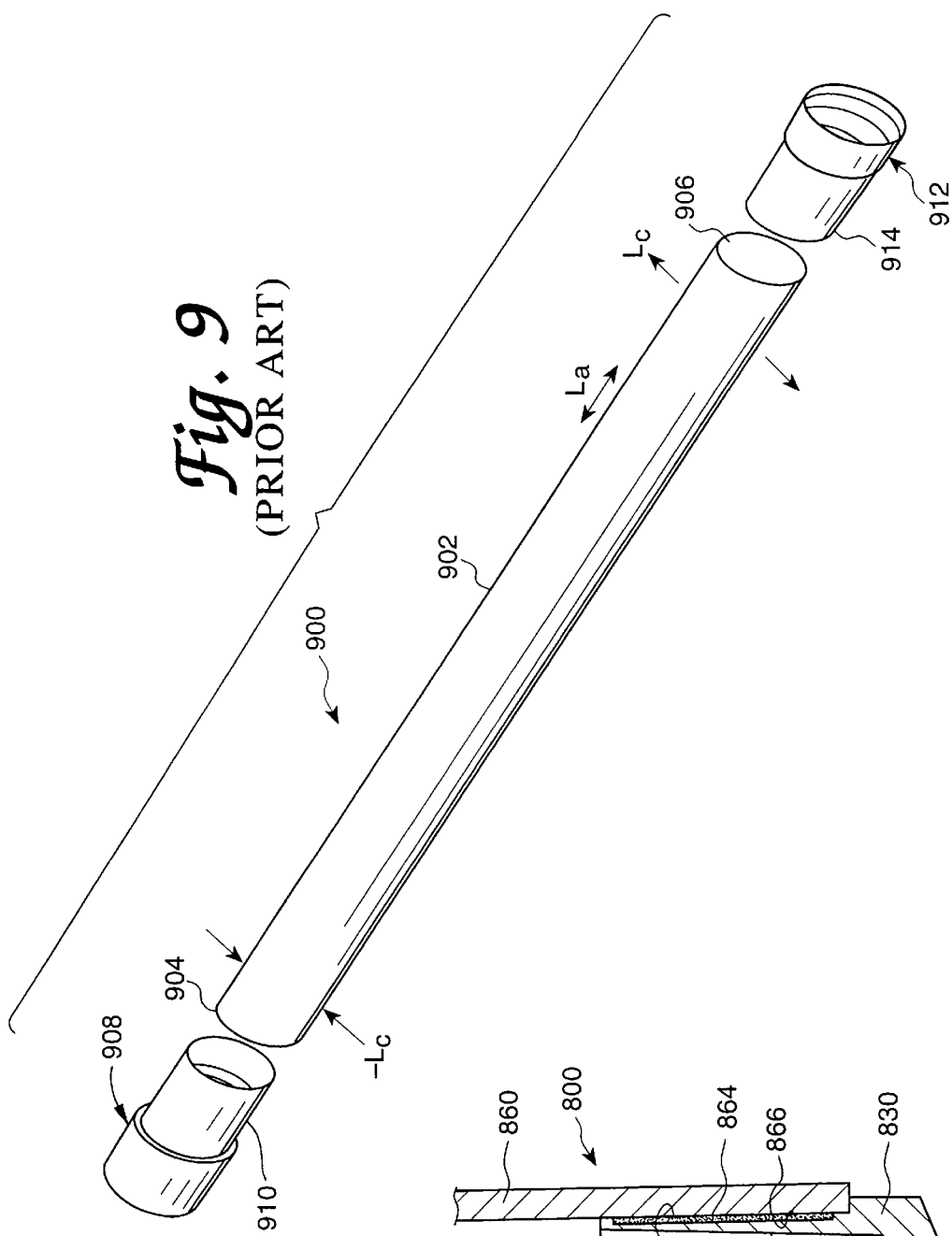
FIG. 9 is an exploded perspective view of a case assembly with end fittings.

The vessel of this invention does not require supplemental mechanical fasteners, and the vessel or casing walls can be configured as a simple prefabricated straight walled cylinder, such as the case sleeve 902 shown in FIG. 9. The preparation of the bond surfaces preferably uses environmentally friendly chemicals. The cooperative relationship between the compression loading assemblies and the bonded joints of the assemblies of this invention results in assemblies that encounter failure in the end closure structures or case sleeves prior to failure at the laterally compression loaded, adhesive joint. Accordingly, case assembly failure can be predicted and tailored by proper choice of end closure structure and composite case assembly parameters, such as diameters and wall thicknesses, rather than at the adhesive bond due to peel stresses, where failure is much less predictable.

Suitable adhesives include, but are not limited to, epoxies, polyimides, polyesters, and polyamides. Since the adhesive bond can be provided with adequate strength without the use of mechanical fasteners at the adhesive junction, the pressure vessel may be provided with inherent high temperature IM relief caused by degradation of the adhesive material auto-ignition temperature of the rocket propellant.

Adhesive selection is also preferably based on strength and compatibility of the adhesive with the selected mating surface materials.

Processibility of the adhesive is another important consideration. For aluminum compression loading assemblies, the preferred surface preparation method is that described in U.S. Pat. No. 5,520,768, the complete disclosure of which is incorporated herein by reference. Should it become desirable to employ titanium compression loading assemblies, a method of surface preparation of titanium substrates is described in U.S. Pat. No. 5,660,884, which is incorporated herein by reference. A primer for the surface preparations, such as UF 3332 available from Cordant Technologies, Inc. (previously Thiokol Corporation), may be used.

A cavity (or bondline) thickness of about 0.030 inch between the end closure structure and the case sleeve structure is preferred, although other thicknesses may be satisfactory and even preferable, depending on the application. The preferred method of placing adhesive into the cavity is injection. Other placement methods such as films, troweling, or brush or spray applications are possible. Low viscosity is desired for adhesives which are injected. Adequate working potlife is highly desirable. The adhesive should be selected such that the temperatures associated with cure (i.e., the heat required to cure the adhesive and the heat generated by the adhesive during cure) does not damage the case assembly or cause the propellant to auto-ignite. Generally, the temperatures associated with cure should not exceed about 180° F. for these reasons.

In developing the method and design of this invention, a variety of composite surface preparations were examined. It was found that a release cloth (commonly referred to as "Peel Ply") incorporated into the surface of the composite prior to cure, then peeled off prior to bonding, produced a uniform and reproducible surface for bonding. The combination of the structural adhesive Duralco 4525 and peel ply yielded both high strength and process insensitivity (robustness) compared to other surface preparations and adhesives examined. Duralco 4525, which is manufactured by Cotronics Corp. of Brooklyn, N.Y., has a viscosity similar to hot maple syrup. This adhesive does not appear to have excessive exothermic reactions and possesses an adequate potlife. Accordingly, peel ply unprimed Duralco 4525 is preferred although other surface preparations may be satisfactory, depending on the application. (EA9394 manufactured by Dexter Hysol Aerospace Materials Division may be used.)

The case sleeve structure is preferably made from a material having a relatively high stiffness so that the load imparted by the laterally-expandable member is transferred into the cured adhesive bond as a compressive load, instead of being transferred through the adhesive bond without compressing the bond. The case sleeve structure can be made of any structural material satisfying this condition, and can be made by any method suitable for rocket motor use, but in a preferred embodiment comprises a composite material. Preferably, the composite case sleeve is constructed using carbon tow, such as M30S tow manufactured by Toray, pre-impregnated with a suitable resin. Suitable resins include, by way of example and without limitation, epoxy, polyimide, polyester, and/or polyamide formulated resins. The composite fibers can be, for example and without limitation, Kevlar, glass, and/or carbon. A chemoheologically tailored matrix resin described in U.S. Pat. No. 5,011,721, and variations and applications of which are described in U.S. Pat. Nos. 5,356,499, 5,545,278, and 5,593,770, is preferred. The complete disclosures of each of these United States patents are incorporated herein by reference. Such matrix resins may be obtained from Cordant Technologies, Inc., TCR Division, previously Thiokol Corporation.

The wall thickness may vary for different applications. The stiffness of the composite case sleeve, which is dictated by wall thickness and laminate lay-up) should be set to substantially match the flexibility and yielding strength of the mating portion of the end closure structure so that, under internal pressure, both the composite case and the end closure structure flex substantially the same amount to prevent the adhesive joint from being subject to such peel or bond normal stresses that failure occurs at the adhesive joint. The above-mentioned 0.030 inch preferred cavity thickness is thick enough so as to ease joint processing without sacrificing joint strength.

The following non-limiting example serves to explain embodiments of this invention in more detail.

EXAMPLES

Example I

Four steel compression loading assemblies each having a design substantially identical to that illustrated in FIG. 1 and described above in connection with the first embodiment were fabricated. The radially-expandable tubular structures contained six axial slots.

All bond surfaces were cleaned by vapor degreasing with methyl chloroform and grit blasting with zirconium silicate. The bonding surfaces were treated with a 0.4 wt % sodium metasilicate solution and a 5 wt % buffered (pH 5) solution of γ-glycidoxypropyltrimethoxysilane coupling agent. Two graphite/epoxy composite tubes were prepared for bonding by removing a peel ply from the inside surface, drilling four $\frac{1}{16}$ inch diameter injection holes in each end and wiping with a methyl chloroform dampened cloth. The radially-expandable members of the four compression loading assemblies were inserted into each end of the tubes. The slots associated with the fins were taped to prevent adhesive spew. Duralco 4525, two part epoxy adhesive was vacuum mixed and injected into the joints. The adhesive was cured for one hour at 170° F. Prior to bonding the radially-expandable member to the inside diameter of the composite tube, a calibration curve of the relationship between the diametrical displacement and number of turns of the threaded interface was constructed. The wedge members were inserted into the respective radially-expandable members, and the wedge members were tightened to create a mechanically induced, preloaded compressive shear joint. (The other composite tube served as a control.) The number of turns was controlled in order to provide an expansion of 0.008 inches. The complete tube assemblies were conditioned to a temperature of 350° F. and tested to failure by pulling axially on the closures at a rate of 0.05 in/min. The results of the test are presented in Table I below:

TABLE I

| A | B | C | D | E |
|---|---|---|---|---|
| 0 | 0 | 3,667 | 4.343 | 844 |
| 100 | 56,000 | 8,288 | 4.343 | 1,908 |

A: the portion (%) of joint area in compressive stress
B: average compressive stress (psi)
C: average axial load at failure (lbs)
D: bond area (in$^2$)
E: average shear strength (psi)

As shown in Table I, the mechanical loading of the adhesive bond joint in compression resulted in an increase in shear strength of from 844 psi to 1908 psi, or an increase of 126%, prior to failure.

A closure device for a rocket motor casing is disclosed in a patent application Ser. No. 09/031,725 entitled CASE ASSEMBLY INCLUDING ADHESIVE BOND THAT IS INSENSITIVE TO HIGH OPERATING PRESSURES AND EXHIBITS INHERENT HIGH TEMPERATURE RELIEF CAPABILITY, AND MOTOR ASSEMBLY AND ROCKET ASSEMBLY INCLUDING THE SAME, filed on Feb. 27, 1998, which is assigned to the assignee of the present application, and the complete disclosure of which is hereby incorporated herein by reference.

This application claims priority of provisional patent application Ser. No. 60/049,777, the complete disclosure of which is incorporated herein by reference.

The foregoing detailed description of the embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An assembly mating first and second substantially tubular bodies, said mating assembly comprising:
    a sleeve structure forming a part of the first tubular body and defining an inner receptacle surface region;
    an adjustable compression loading assembly at least partially received in said sleeve structure and integrally formed with, constituted by, or otherwise securable to the second tubular body, said adjustable compression loading assembly having a longitudinal axis and comprising a laterally-expandable member and a wedge member, said wedge member having an outer surface region received by an inner surface region of said laterally-expandable member; and
    a cured adhesive bond positioned between an exterior surface region of said laterally-expandable member and said inner receptacle surface region to couple said sleeve structure to said laterally-expandable member,
    wherein said adjustable compression loading assembly is constructed and arranged to permit relative longitudinal movement of said wedge member towards and away from said laterally-expandable member and said sleeve structure coupled thereto between (a) a load-free position, in which said wedge-member outer surface region is not larger in lateral dimension than a longitudinally-corresponding portion of said laterally-expandable-member inner surface region and (b) at least one load-imparting position, in which said wedge-member outer surface region expands said laterally-expandable-member exterior surface region laterally outward and thereby compresses said cured adhesive bond in the substantially lateral direction to increase the strength of said adhesive bond by reducing stresses substantially normal to said adhesive bond on said mating assembly due to longitudinal loading, torsional loading, or a combination of longitudinal and torsional loading, and
    wherein relative movement of said wedge towards said sleeve structure adjusts said compression loading assembly from the load-free position to the load-imparting position, and relative movement of said wedge away from said sleeve structure adjusts said compression loading assembly from the load-imparting position to the load-free position.

2. A mating assembly according to claim 1, wherein:
    at least a portion of said laterally-expandable-member inner surface region tapers laterally inward along a longitudinal direction towards said sleeve structure to define a laterally-expandable-member tapering surface region; and
    at least a portion of said wedge-member outer surface region tapers laterally inward along the same longitudinal direction as said laterally-expandable-member tapering surface region to define a wedge-member tapering surface region.

3. A mating assembly according to claim 2, wherein said wedge-member tapering surface region and said laterally-expandable-member tapering surface region each are frustro-conically shaped and concentrically aligned with each other.

4. A mating assembly according to claim 3, wherein at least a portion of said wedge-member tapering surface region and at least a portion of said laterally-expandable-member tapering surface region contain threads complementary to one another such that rotation of said wedge member relative to said laterally-expandable member engages said complementary threads and moves said wedge member towards said laterally-expandable member to control the position of said wedge member relative to said laterally-expandable member.

5. A mating assembly according to claim 4, wherein said complementary threads respectively extend continuously along entire lengths of said wedge-member tapering surface region and said laterally-expandable-member tapering surface region.

6. A mating assembly according to claim 3, wherein:
    said mating assembly further comprises first and second shims spaced from each other; and
    said inner receptacle surface region of said sleeve structure and said radially-expandable member exterior surface region collectively define a substantially annular cavity in which said cured adhesive bond is accommodated.

7. A mating assembly according to claim 2, wherein in the load-imparting position, at least a portion of said wedge-member tapering surface region is larger in lateral dimension than a longitudinally-corresponding portion of said laterally-expandable-member tapering surface region so as to expand said laterally-expandable member exterior surface region laterally outward.

8. A mating assembly according to claim 1, wherein said laterally-expandable member contains at least one elongated slot defined therein extending from one end of said laterally-expandable member along the longitudinal direction, said elongated slot being constructed and arranged to reduce stresses in said laterally-expandable member during lateral expansion.

9. A mating assembly according to claim 1, wherein at least a portion of said wedge member is made of an elastically expandable material, and wherein in the load-imparting position said elastically expandable portion is compressed longitudinally to such a degree that said elastically expandable portion expands the laterally-expandable member laterally outward and thereby compresses said cured adhesive bond in the substantially lateral direction.

10. A mating assembly according to claim 1, wherein said wedge member is comprised of two separable components, one of which has a tapering outer surface region.

11. A mating assembly according to claim 1, wherein said mating assembly is a structural strut.

12. An assembly mating first and second substantially tubular bodies, said mating assembly comprising:
    a sleeve structure forming a part of the first tubular body and defining an inner receptacle surface region;
    an adjustable compression loading assembly at least partially received in said sleeve structure and integrally formed with, constituted by, or otherwise securable to the second tubular body, said adjustable compression loading assembly having a longitudinal axis and comprising a laterally-expandable member and a wedge member, said wedge member having an outer surface region received by an inner surface region of said laterally-expandable member; and a cured adhesive bond positioned between an exterior surface region of said laterally-expandable member and said inner receptacle surface region to couple said sleeve structure to said laterally-expandable member, wherein said adjustable compression loading assembly is constructed and arranged to permit relative longitudinal movement of said wedge member towards and away from said laterally-expandable member and said sleeve structure coupled thereto between (a) a load-free position, in which said wedge-member outer surface region is not larger in lateral dimension than a longitudinally-corresponding portion of said laterally-expandable-member inner surface region and (b) at least one load-imparting position, in which said wedge-member outer surface region expands said laterally-expandable-member exterior surface region laterally outward and thereby compresses said cured adhesive bond in the substantially lateral direction to increase the strength of said adhesive bond by reducing stresses substantially normal to said adhesive bond on said mating assembly due to longitudinal loading, torsional loading, or a combination of longitudinal and torsional loading, and wherein relative movement of said wedge away from said sleeve structure adjusts said compression loading assembly from the load-free position to the load-imparting position, and relative movement of said wedge towards said sleeve structure adjusts said compression loading assembly from the load-imparting position to the load-free position.

13. A mating assembly according to claim 12, wherein:

at least a portion of said laterally-expandable-member inner surface region tapers laterally inward along a longitudinal direction away from said sleeve structure to define a laterally-expandable-member tapering surface region; and at least a portion of said wedge-member outer surface region tapers laterally inward along the same longitudinal direction as said laterally-expandable-member tapering surface region to define a wedge-member tapering surface region.

14. A mating assembly according to claim 13, wherein said wedge-member tapering surface region and said laterally-expandable-member tapering surface region each are frustro-conically shaped and concentrically aligned with each other.

15. A mating assembly according to claim 14, wherein:

said mating assembly further comprises first and second shims spaced from each other; and said inner receptacle surface region of said sleeve structure and said radially-expandable member exterior surface region collectively define a substantially annular cavity in which said cured adhesive bond is accommodated.

16. A mating assembly according to claim 12, wherein at least a portion of said wedge member is made of an elastically expandable material, and wherein in the load-imparting position said elastically expandable portion is compressed longitudinally to such a degree that said elastically expandable portion expands the laterally-expandable member laterally outward and thereby compresses said cured adhesive bond in the substantially lateral direction.

17. A mating assembly according to claim 12, wherein said mating assembly is a structural strut.

18. A mating assembly according to claim 12, wherein said compression loading assembly further comprises a compression load controlling means for controlling movement between the load-free and load-imparting positions.

19. A mating assembly according to claim 12, wherein:

said compression loading assembly and said sleeve structure collectively define a hermetically sealed chamber; and movement of said wedge member between the load-free and load-imparting positions is influenced and controllable by the degree of internal pressurization of said hermetically sealed chamber.

20. A mating assembly according to claim 12, wherein said wedge member is cooperatively associated with said first tubular body to move axially in tandem with said first tubular body so that, in use, movement of said first and second tubular bodies away from each other increases the compressive load applied to said cured adhesive bond and movement of said first and second tubular bodies towards each other reduces the compressive load applied to said cured adhesive bond.

* * * * *